(12) United States Patent
Hu (10) Patent No.: US 12,093,712 B2
(45) Date of Patent: Sep. 17, 2024

(54) METHOD AND APPARATUS FOR HANDLING MEMORY FAILURE, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventor: Xiaowei Hu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 571 days.

(21) Appl. No.: 17/211,272

(22) Filed: Mar. 24, 2021

(65) Prior Publication Data

US 2021/0208923 A1 Jul. 8, 2021

(30) Foreign Application Priority Data

May 29, 2020 (CN) .......................... 202010477094.7

(51) Int. Cl.
*G06F 9/455* (2018.01)
*G06N 7/01* (2023.01)
(52) U.S. Cl.
CPC ........... *G06F 9/45558* (2013.01); *G06N 7/01* (2023.01); *G06F 2009/4557* (2013.01); *G06F 2009/45583* (2013.01)
(58) Field of Classification Search
CPC .. G06F 9/45558–52; G11C 16/34–349; G11C 29/52; G11C 2029/0409
See application file for complete search history.

(56) References Cited

U.S. PATENT DOCUMENTS 10,375,169 B1 * 8/2019 Diallo ................. G06F 11/301
2005/0188278 A1 8/2005 Zimmer et al.
(Continued)

FOREIGN PATENT DOCUMENTS

CN 106547607 A 3/2017
CN 106681797 A 5/2017
(Continued)

OTHER PUBLICATIONS

A Rising Tide Lifts All Boats: How Memory Error Prediction and Prevention Can Help with Virtualized System Longevity Yuyang Du, Hongliang Yu, Yunhong Jiang, Yaozu Dong, Weimin Zheng (Year: 2010).*

(Continued)

*Primary Examiner* — Emerson C Puente
*Assistant Examiner* — Paul V Mills
(74) *Attorney, Agent, or Firm* — Osha Bergman Watanabe & Burton LLP (57) ABSTRACT

A method and an apparatus for handling a memory failure is provided. The method includes: in response to detecting a failure occurring in memory of a host machine, acquiring a failure parameter of the memory, determining a crash probability of the host machine based on the failure parameter, and transferring all virtual machines on the host machine to a target host machine when the crash probability is greater than or equal to a first predetermined threshold. A crash probability of the target host machine is less than a second predetermined threshold. The second predetermined threshold is less than the first predetermined threshold. Further, an electronic device and storage medium are provided.

11 Claims, 5 Drawing Sheets

(56) References Cited

U.S. PATENT DOCUMENTS

| | | | |
|---|---|---|---|
| 2009/0178046 A1* | 7/2009 | Jain | G06F 9/5005 |
| | | | 718/104 |
| 2010/0333089 A1* | 12/2010 | Talwar | G06F 11/301 |
| | | | 718/1 |
| 2012/0054543 A1 | 3/2012 | Dreier | |
| 2016/0292000 A1* | 10/2016 | Bernal | G06F 9/4856 |
| 2017/0060616 A1* | 3/2017 | Onoue | G06F 9/45558 |
| 2018/0329646 A1 | 11/2018 | Dai et al. | |
| 2019/0286475 A1* | 9/2019 | Mani | G06F 9/45558 |
| 2019/0377625 A1* | 12/2019 | Chintalapati | G06N 7/01 |
| 2019/0384668 A1* | 12/2019 | Aiyar | G06F 11/0709 |
| 2020/0004648 A1* | 1/2020 | Xu | G06F 11/3688 |
| 2021/0109830 A1* | 4/2021 | Venugopal | H04L 67/10 |

FOREIGN PATENT DOCUMENTS

| | | |
|---|---|---|
| CN | 110399253 A | 11/2019 |
| WO | 2020000405 A1 | 1/2020 |

OTHER PUBLICATIONS

Timely Virtual Machine Migration for Pro-Active Fault Tolerance Andreas Polze, Peter Troger (Year: 2011).*

Risk-driven Proactive Fault-tolerant Operation of IaaS Providers Jordi Guitart, Mario Macias, Karim Djemame, Tom Kirkham, Ming Jiang, and Django Armstrong (Year: 2013).*

Using Thermal-Aware VM Migration Mechanism for High-Availability Cloud Computing Ying-Jun Chen, Gwo-Jiun Horng, Jian-Hua Li, Sheng-Tzong Cheng (Year: 2017).*

Using Proactive Fault-Tolerance Approach to Enhance Cloud Service Reliability Jialei Liu, Shangguang Wang, Sathish A. P. Kumar, and Rajkumar Buyya (Year: 2018).*

Risk Assessment Models for Resource Failure in Grid Computing Raid Abdullah Alsoghayer The University of Leeds School of Computing; Doctoral Thesis (Year: 2011).*

Loosely coupled coordinated management in virtualized data centers Sanjay Kumar, Vanish Talwar, Vibhore Kumar, Parthasarathy Ranganathan, Karsten Schwan (Year: 2011).*

Office Action issued in corresponding KR Application No. 10-2021-0042579 with English translation dated Jul. 25, 2022 (10 pages).

Office Action issued in corresponding CN Application No. 202010477094.7 with English translation dated Jan. 10, 2023 (21 pages).

Extended European Search Report issued in corresponding EP Application No. 21163399.5 dated Dec. 16, 2021 (13 pages).

Swami, Shivam et al. "Reliable Nonvolatile 3,4,10, Memories: Techniques and Measures", 11 IEEE Design&Test, IEEE, Piscataway, NJ, USA, vol. 34, No. 3, Jun. 1, 2017 pp. 31-41 (11 pages).

European Search Report issued in EP Application No. 21163399.5 dated Sep. 14, 2021 (14 pages).

Butoi Alexandru et al: "Autonomous Management of Virtual Machine Failures in IaaS Using Fault Tree Analysis" In: "Advances in Intelligent Data Analysis XIX", Jan. 1, 2014 (Jan. 1, 2014), Springer International Publishing, Cham 032528 (16 pages).

Anonymous: "GNU GRUB Manual 2.02: badram", Nov. 8, 2017 (Nov. 8, 2017), XP055837216, Retrieved from the Internet: URL:https://web.archive.org/web/20171108091606/https://www.gnu.org/software/grub/manual/grub/htmlnode/badram.html [retrieved on—Sep. 2, 2021] (1 page).

* cited by examiner

METHOD AND APPARATUS FOR HANDLING MEMORY FAILURE, ELECTRONIC DEVICE AND STORAGE MEDIUM

CROSS-REFERENCE TO RELATED APPLICATIONS

This application is based upon and claims benefit of priority to a Chinese Patent Application 202010477094.7, filed on May 29, 2020, the entire contents of which are incorporated herein by reference.

FIELD

The present disclosure relates to a field of cloud computation in the computer technology, and more particularly, to a method and an apparatus for handling a memory failure, an electronic device and storage medium.

BACKGROUND

At present, as continuous development of relate services based on the Internet, a scale of virtual machines deployed on a host machine is enlarged continuously.

In related art, when a failure occurs in memory of the host machine, all the virtual machines on the host machine are controlled to stop providing services.

SUMMARY

The present disclosure provides a method and an apparatus for handling a memory failure, an electronic device, and storage medium.

According to an aspect of the embodiments of the present disclosure, there is provided a method for handling a memory failure. The method includes acquiring a failure parameter of memory of a host machine in response to detecting a failure occurring in the memory, determining a crash probability of the host machine based on the failure parameter, and transferring all virtual machines on the host machine to a target host machine when the crash probability of the host machine is greater than or equal to a first predetermined threshold. A crash probability of the target host machine is less than a second predetermined threshold which is less than the first predetermined threshold.

According to another aspect of the embodiments of the present disclosure, there is provided an apparatus for handling a memory failure. The apparatus includes a first acquiring module, a determining module and a handling module. The first acquiring module is configured to acquire a failure parameter of memory of a host machine in response to detecting a failure occurring in the memory. The determining module is configured to determine a crash probability of the host machine based on the failure parameter. The handling module is configured to transfer all virtual machines on the host machine to a target host machine when the crash probability of the host machine is greater than or equal to a first predetermined threshold. A crash probability of the target host machine is less than a second predetermined threshold which is less than the first predetermined threshold.

According to a third aspect of the embodiments of the present disclosure, an electronic device is provided and includes: at least one processor; memory communicatively coupled to the at least one processor. The memory is configured to store instructions executable by the at least one processor. When the instructions are executed by the at least one processor, the at least one processor is caused to implement the method for handling a memory failure according to the first aspect of the embodiments.

According to a fourth aspect of the embodiments of the present disclosure, a non-transitory computer-readable storage medium is provided having computer instructions stored therein. The computer instructions are configured to cause a computer to perform the method for handling a memory failure according to the first aspect of the embodiments.

It is to be understood that the above summary of the present disclosure is not intended to describe the key or important features of embodiments of the present disclosure, and shall not be construed to limit the scope of the present disclosure. Additional features of embodiments of present disclosure will be given in part in the following descriptions, become apparent in part from the following descriptions.

BRIEF DESCRIPTION OF THE DRAWINGS

The accompanying drawings are used to generally understand the present disclosure, and shall not be construed to limit the present disclosure, in which.

DETAILED DESCRIPTION

Reference will now be made in detail to exemplary embodiments, which are illustrated in the accompanying drawings. The implementations set forth in the following description of exemplary embodiments do not represent all implementations consistent with the disclosure. It would be appreciated by those skilled in the art that the above embodiments cannot be construed to limit the present disclosure, and changes, alternatives, and modifications can be made in the embodiments without departing from spirit, principles and scope of the present disclosure. Also, for clarity and conciseness, some well-known functions and structures are omitted in the following descriptions.

A method for handling a memory failure, an apparatus for handing a memory failure, an electronic device and storage medium according to embodiments of the present disclosure will be described below with reference to the accompanying drawings.

Figure 1:
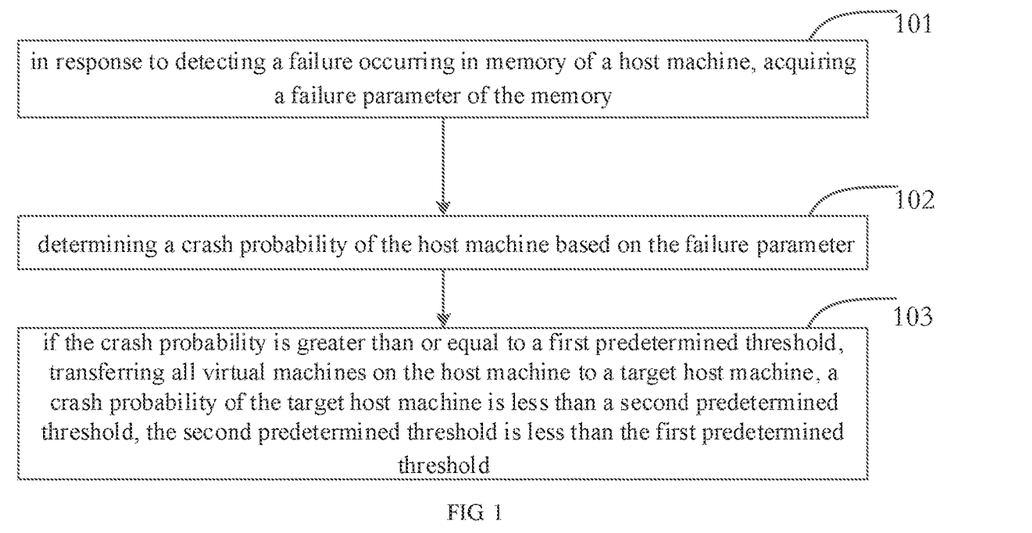
FIG. 1 is a flowchart showing a method for handling a memory failure according to a first embodiment of the present disclosure.

FIG. 1 is a flowchart showing a method for handling a memory failure according to a first embodiment of the present disclosure.

In practice, as continuous development of cloud service, a scale of virtual machines deployed on a host machine is enlarged continuously, such that more and more memory failures occur in the host machine, which may cause a crash of the host machine. In the related art, if the host machine crashed, all the virtual machines on the host machine are controlled to stop providing services, such that the services used by users are affected, and quality of the cloud service is decreased.

In order to solve the above problem, the present disclosure proposes a method for handing a memory failure. When detecting a failure occurring in memory of a host machine, a failure parameter of the failed memory is acquired, a crash probability of the host machine is determined based on the failure parameter and if the crash probability is greater than or equal to a first predetermined threshold, all virtual machines on the host machine are transferred to a target host machine. A crash probability of the target host machine is less than a second predetermined threshold which is less than the first predetermined threshold. In other words, the crash probability is determined based on the failure parameter and the virtual machines on the host machine are transferred to the target host machine whose crash probability is less than that of the host machine timely in the case that the crash probability of the host machine is large, such that an effect of a crash failure on the virtual machine can be avoided, thus improving user experience and quality of service.

As illustrated in FIG. 1, the method for handling a memory failure may include the followings.

At block 101, in response to detecting a failure occurring in memory of a host machine, a failure parameter of the memory is acquired.

In the embodiment, the host machine is a physical basis of a virtual machine. The virtual machine exists in the host machine and shares hardware and memory with the host machine. One or more virtual machines may exist in one host machine.

In the embodiment, the failure of the memory of the host machine is focused, i.e., the failure of the memory of the host machine caused during usage of the virtual machine, which will not cause a crash directly, such that a crash probability is determined based on the failure parameter, and it is determined whether the virtual machine is transferred based on the crash probability, thus improving the quality of service for users and improving the user experience.

In the embodiment, there are many ways to detect the failure occurring in the memory of the host machine, which may be selected based on actual applications and described bellows by way of examples.

For an example, based on a first code corresponding to a target position of a target memory page of the host machine that is generated by writing information into the target position of the target memory page, and based on a second code corresponding to the target position of the target memory page of the host machine that is generated by reading information out from the target position of the target memory page, the first code is compared with the second code, if they are different, it is determined that a failure occurs in the memory of the host machine.

For another example, it is determined that a failure occurs in the memory of the host machine based on an error of a process of the virtual machine or an error of service feedback of the virtual machine.

Further, when detecting a failure occurring in the memory of the host machine, the failure parameter of the failed memory is acquired, for example, one or more of features of incorrect bits, such as the number of the incorrect bits, positions features of the incorrect bits, time features of the incorrect bits.

It should be understood that there are many ways to acquire the failure parameter, which may be selected based on actual applications and described bellows by way of examples.

For an example, the code corresponding to the written information and the code corresponding to the read-out information are parsed based on a predetermined algorithm, difference codes between the parsed first code and the parsed second code are acquired, one or more incorrect bits corresponding to the target position of the target memory page are determined based on the difference codes, and the number of the one or more incorrect bits and the position features of the one or more incorrect bits are obtained based on the one or more incorrect bits.

For another example, the written information and the read-out information are compared one by one directly to obtain one or more incorrect bits which are not inconsistent, and the position features and the time features of the one or more incorrect bits are obtained.

At block 102, a crash probability of the host machine is determined based on the failure parameter.

In the embodiment, if the failure occurs in the memory but the host machine does not crash, the crash probability of the host machine may be determined based on the failure parameter.

It should be understood that there are many ways to determine the crash probability of the host machine based on the failure parameter, which may be selected based on actual applications and described bellows by way of examples.

For an example, a pre-trained probability analysis module is acquired, and the failure parameter is inputted into the probability analysis module to obtain the crash probability of the host machine.

For another example, a formula is established based on a relation between multiple historical failure parameters and multiple historical probabilities and the crash probability of the host machine is obtained by calculation using the formula and the failure parameter.

For a still example, the crash probability of the host machine corresponding to the failure parameter is obtained by querying a predetermined mapping table.

At block 103, if the crash probability is greater than or equal to a first predetermined threshold, all virtual machines on the host machine are transferred to a target host machine. A crash probability of the target host machine is less than a second predetermined threshold. The second predetermined threshold is less than the first predetermined threshold.

In the embodiment, after acquiring the crash probability of the host machine, a probability that the host machine crashes under a situation of the current failure occurring in the memory of the host machine may be known. The first threshold is set, and if the crash probability is greater than or equal to the first threshold set in advance, it indicates that it is highly possible that the host machine crashes, all the virtual machines on the host machine need to be transferred to the target host machine whose crash probability is less than that of the host machine, so as to ensure that the services for users are normal, and to improve the quality of service and the user experience. After the transference is finished, the host machine can be rebooted.

The first predetermined threshold and the second predetermined threshold may be set according to historical experiences of timings of the crashes of multiple host machines or according to application requirements. For example, by summarizing crash reasons of the host machines in cloud environment, it may be determined that the host machine may crash after a while if the failure occurs in the memory and the crash probability is determined as 40% based on the failure parameter. Thus, the first predetermined threshold may be set to 40%. In order to ensure that the virtual service after the transference may work normally, the second predetermined threshold is less than the first predetermined threshold. The smaller the second predetermined threshold, the smaller the crash probability of the target host machine. The virtual service after the transference may be guaranteed to work normally.

It should be noted that if the crash probability of the host machine is less than the first predetermined threshold, it indicates that the possibility that the host machine crashes is small, and the host machine may continue to serve the virtual machines or some virtual machines are transferred, which may be set according to actual applications.

With the method for handling a memory failure according to the embodiment of the present disclosure, when detecting the failure occurring in the memory of the host machine, the failure parameter of the failed memory is acquired, the crash probability of the host machine is determined based on the failure parameter and if the crash probability is greater than or equal to the first predetermined threshold, all the virtual machines on the host machine are transferred to the target host machine. The crash probability of the target host machine is less than the second predetermined threshold which is less than the first predetermined threshold. In this way, a problem that all the virtual machines on the host machine stop providing services when a failure occurs in the memory of the host machine can be avoided. The virtual machines on the host machine are transferred to the target host machine whose crash probability is less than that of the host machine when the crash probability of the host machine is greater than or equal to the predetermined threshold, such that an effect of a crash failure on the virtual machine can be avoided, thus improving user experience and quality of service.

It should be noted that with the method for handling a memory failure in the present disclosure, the crash probability may be determined based on the failure parameter and whether to transfer may be determined based on a comparison of the crash probability and the threshold in each host machine, or each host machine may send the failure parameter to a server for analysis, receives a control instruction sent by the server based on an analysis result and operates based on the control instruction, which may be set according to actual applications, and not limited herein.

Based on the above description of the embodiment, it may be understood that it may be determined or confirmed with high probability which virtual machine processes cause the failure at the same time when detecting the failure occurring in the memory of the host machine, the corresponding virtual machines processes may be closed and the host machine stops providing services for the corresponding virtual machines, further the failed memory may be marked and separated so as to avoid the crash failure. Details will be described with reference to FIG. 2.

Figure 2:
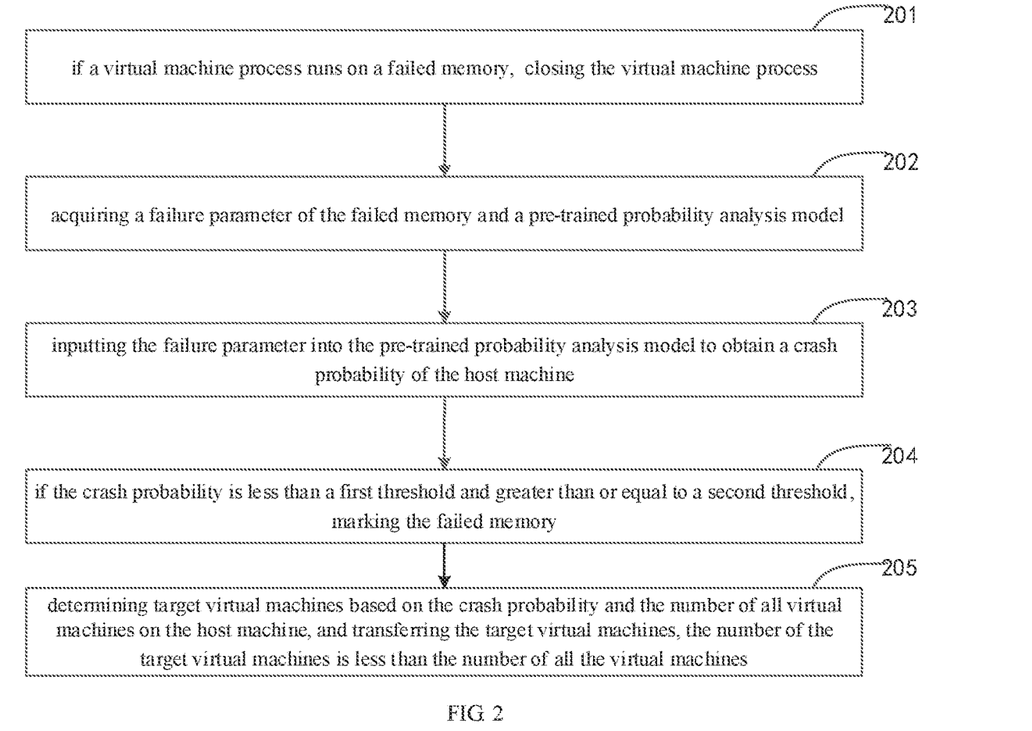
FIG. 2 is a flowchart showing a method for handling a memory failure according to a second embodiment of the present disclosure.

FIG. 2 is a flowchart showing a method for handling a memory failure according to a second embodiment of the present disclosure.

As illustrated in FIG. 2, the method for handling a memory failure may include the followings.

At block 201, if a virtual machine process runs on a failed memory, the virtual machine process is closed.

In detail, when detecting a failure occurring in memory of a host machine, for example, detecting that a failure occurs in the second page of target memory pages of the host machine, if a virtual machine A just written information into the pages 1-20 of the target memory pages of the host machine, it may be determined that the memory failure is caused by the virtual machine A, then the process of the virtual machine A can be closed, to reduce risk of crash, thus avoiding an effect of the crash failure on other services and proving the quality of service.

Regarding the way of detecting the failure occurring in the memory of the host machine, reference can be made to the description of the above embodiment, which is not repeated here.

At block 202, a failure parameter of the failed memory and a pre-trained probability analysis model are acquired.

At block 203, the failure parameter is inputted into the pre-trained probability analysis model to obtain a crash probability of the host machine.

In the embodiment, it should be understood that failure parameter samples and probability samples may be acquired in advance, and the failure parameter samples and the probability samples may be used to train model coefficients of the probability analysis model.

Thus, the failure parameter is inputted into the probability analysis model, and the failure parameter is processed by the pre-trained model coefficients to obtain the crash probability of the host machine, such that an efficiency of acquiring the crash probability is improved.

At block 204, if the crash probability is less than a first threshold and greater than or equal to a second threshold, the failed memory is marked.

At block 205, target virtual machines are determined based on the crash probability and the number of all virtual machines on the host machine, and the target virtual machines are transferred. The number of the target virtual machines is less than the number of all the virtual machines.

In the embodiment, in order to further improve a flexibility of handling the failed memory, in addition to the first threshold set in the above embodiment, the second threshold may be set. The first threshold is greater than the second threshold.

In other words, the crash probability being less than the first threshold indicates that the probability that the host machine crashes is low, but it is still possible that the host machine crashes. Thus, by setting the second threshold less than the first threshold, further determination and process are performed. For example, if the first threshold is 60%, the second threshold may be set to 40%.

In the embodiment, the crash probability is less than the first threshold, it is determined that the crash probability is greater than or equal to the second threshold, the failed memory is marked, and other normal memory of the host machine is used continually. In other words, if there is a risk of crash and the risk is caused by the failed memory with high probability, the failed memory may be marked and separated, and other normal memory of the host machine is used continually, such that other services may work continually, thus improving efficiency and quality of service.

Based on the above, since the crash probability is greater than or equal to the second threshold, it is still possible that the host machine crashes. In order to further avoid the effect of the crash on the virtual machine service, the target virtual machines can be determined based on the number of all the virtual machines on the host machine and the crash probability, and the target virtual machines are transferred. The number of the target virtual machines is less than the number of all the virtual machines.

The virtual machines may be sorted based on service information (such as real-time service, service object or the like) of the virtual machines, and if it is determined that three to five virtual machines can be transferred based on the crash probability, then the last three virtual machines may be selected to be transferred. The target virtual machines and the number of the target virtual machines to be transferred may be select according to actual application, to further ensure the quality of service and the user experience.

It should be noted that if the crash probability is greater than or equal to the first predetermined threshold, all the virtual machines on the host machine are transferred. When the transference is finished, the host machine is closed. If the crash probability is less than the second threshold, no further process is required, only the failed memory is marked and other normal memory of the host machine is used continually.

With the method for handling a memory failure according to the embodiment of the present disclosure, if the virtual machine process runs on the failed memory, the virtual machine process is closed, the failure parameter of the failed memory and the pre-trained probability analysis model are acquired, the failure parameter is inputted into the probability analysis model and processed by the pre-trained model coefficients to obtain the crash probability of the host machine and if the crash probability is less than the first threshold but greater than the second threshold, the failed memory is marked and the target virtual machines are determined based on the crash probability and the number of all the virtual machines on the host machine, and the target virtual machines are transferred. The number of the target virtual machines is less than the number of all the virtual machines. In this way, when the failure occurs in the memory of the host machine, the virtual machine process running on the failed memory is closed, the failed memory is marked and separated, and some virtual machines are transferred to other host machines, such that an effect of a crash failure on the virtual machine can be avoided, thus improving user experience and quality of service.

Figure 3:
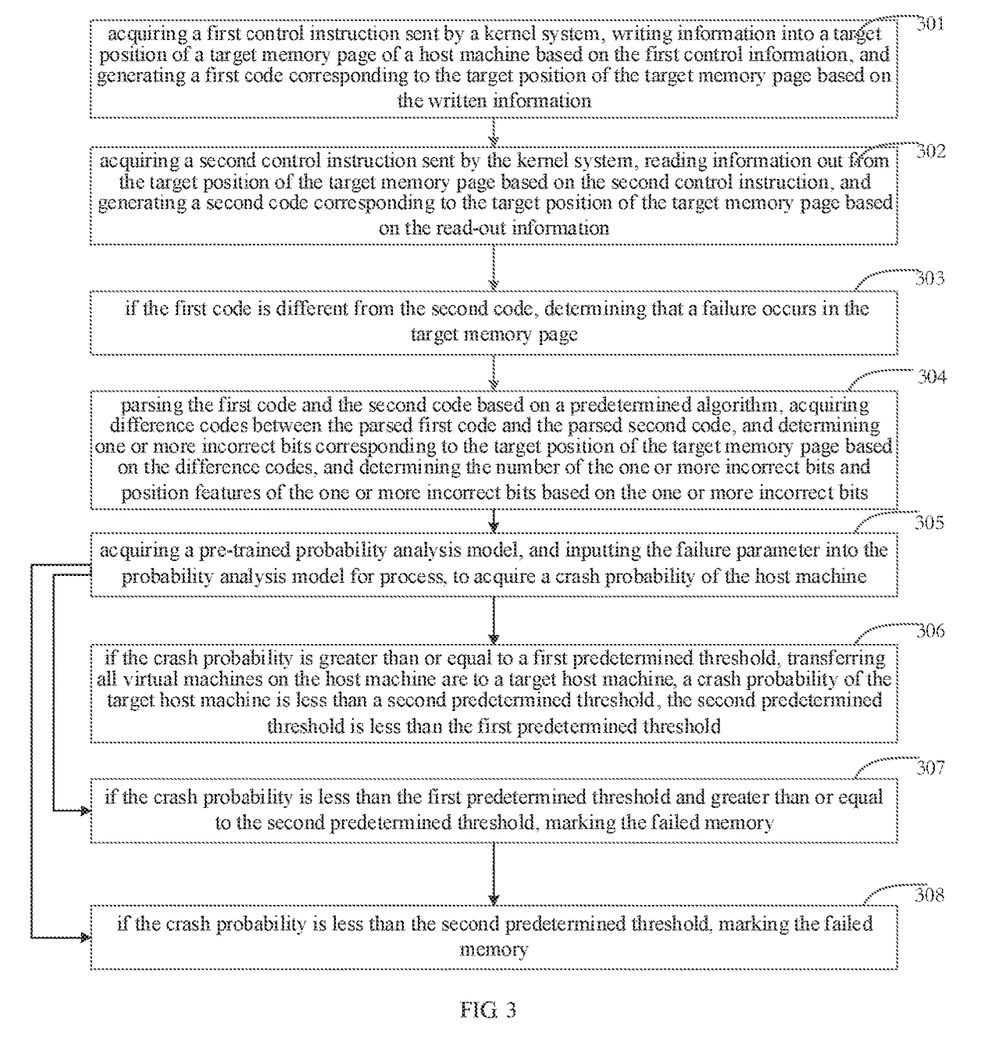
FIG. 3 is a flowchart showing a method for handling a memory failure according to a third embodiment of the present disclosure.

FIG. 3 is a flowchart showing a method for handling a memory failure according to a third embodiment of the present disclosure.

As illustrated in FIG. 3, the method for handling a memory failure may include the followings.

At block 301, a first control instruction sent by a kernel system is acquired, information is written into a target position of a target memory page of a host machine based on the first control information, and a first code corresponding to the target position of the target memory page is generated based on the written information.

In the embodiment, different modes of handing the memory failure may be set for different application scenarios. Before detecting the failure, it may be determined which mode for handing the memory failure is enabled based on a kernel parameter of the host machine. For example, the kernel parameter 1 indicated that the mode for handing the memory failure according to the embodiment is performed, and for another example, the kernel parameter 2 indicates that the mode for detecting the memory failure and directly closing the host machine is performed, which can be set according to actual application scenarios.

In the embodiment, information is written into or read out from the target position of the target memory page of the host machine based on the instruction sent by the kernel system. Thus, after acquiring the first control instruction sent by the kernel system, since the first control information is a writing instruction, including information such as bits to be written and written position identifier, the information may be written into the target position of the target memory page of the host machine based on the first control instruction.

Further, the first code corresponding to the target position of the target memory page may be generated based on the written information and a coding algorithm. For example, if the written information is "ABC", the code may be "11001".

At block 302, a second control instruction sent by the kernel system is acquired, information is read out from the target position of the target memory page based on the second control instruction, and a second code corresponding to the target position of the target memory page is generated based on the read-out information.

At block 303, if the first code is different from the second code, it is determined that a failure occurs in the target memory page.

In the embodiment, information is written into or read out from the target position of the target memory page of the host machine based on the instruction sent by the kernel system. Thus, after acquiring the second control instruction sent by the kernel system, since the second control information is a reading instruction, including information such as bits to be read and read position identifier, the information may be read out from the target position of the target memory page of the host machine based on the second control instruction.

Further, the second code corresponding to the target position of the target memory page may be generated based on the read-out information and a coding algorithm. For example, if the read-out information is "ABC", the code may be "11001".

It can be understood that in the case that no failure occurs in the memory, the first code and the second code are consistent. Thus, if the first code and the second code are different, it is determined that the failure occurs in the target memory page. For example, if both the first code and the second code are "11001", it indicates that there is no failure. If the first code is "11001" while the second code is "00001", it is determined that the failure occurs in the target memory page.

At block 304, the first code and the second code are parsed based on a predetermined algorithm, difference codes between the parsed first code and the parsed second code are acquired, and one or more incorrect bits corresponding to the target position of the target memory page are determined based on the difference codes, and the number of the one or more incorrect bits and position features of the one or more incorrect bits are determined based on the one or more incorrect bits.

In detail, the first code and the second code are parsed based on the predetermined algorithm to obtain the difference codes between them. For example, an automatic comparison algorithm is used to obtain the difference codes "11" and "00" between the first code "11001" and the second code "00001". The one or more incorrect bits corresponding to the target position of the target memory page are determined based on the difference codes. For example, it may be determined based on the above difference codes that there are incorrect bits at the target positions of the target memory page that corresponding to the first bit and the second bit. The number of the one or more incorrect bits and the position features of the one or more incorrect bits are acquired based on the one or more incorrect bits.

In other words, it may be determined based on the difference codes which bit at which target position of which target memory page is incorrect. For example, the bits at positions 1, 3 and 5 of page 3 are incorrect. The number of the incorrect bits and the position features of the incorrect bits may be acquired based on the incorrect bits.

At block 305, a pre-trained probability analysis model is acquired, and the failure parameter is inputted into the probability analysis model for process, to acquire a crash probability of the host machine.

In the embodiment, it should be understood that failure parameter samples and probability samples may be acquired in advance, and the failure parameter samples and the probability samples may be used to train model coefficients of the probability analysis model.

Thus, the failure parameter is inputted into the probability analysis model, and the failure parameter is processed by the pre-trained model coefficients to obtain the crash probability of the host machine, such that an efficiency of acquiring the crash probability is improved.

At block 306, if the crash probability is greater than or equal to a first predetermined threshold, all virtual machines on the host machine are transferred to a target host machine. A crash probability of the target host machine is less than a second predetermined threshold. The second predetermined threshold is less than the first predetermined threshold.

At block 307, if the crash probability is less than the first predetermined threshold and greater than or equal to the second predetermined threshold, the failed memory is marked.

At block 308, if the crash probability is less than the second predetermined threshold, the failed memory is marked.

In the embodiment, after acquiring the crash probability of the host machine, a probability that the host machine crashes under a situation of the current failure occurring in the memory of the host machine may be known. The first predetermined threshold is set, and if the crash probability is greater than or equal to the first predetermined threshold, it indicates that it is highly possible that the host machine crashes, all the virtual machines on the host machine need to be transferred, so as to ensure that the services for users are normal, and to improve the quality of service and the user experience. After the transference is finished, the host machine can be rebooted.

In the embodiment, in order to further improve a flexibility of handling the failed memory, in addition to the first predetermined threshold set in the above embodiment, the second predetermined threshold may be set. The first predetermined threshold is greater than the second predetermined threshold.

In other words, the crash probability being less than the first predetermined threshold indicates that the probability that the host machine crashes is low, but it is still possible that the host machine crashes. Thus, by setting the second predetermined threshold less than the first predetermined threshold, further determination and process are performed. For example, if the first predetermined threshold is 60%, the second predetermined threshold may be set to 40%.

In the embodiment, the crash probability is less than the first predetermined threshold, it is determined that the crash probability is greater than or equal to the second predetermined threshold, the failed memory is marked, and other normal memory of the host machine is used continually. In other words, if there is a risk of crash and the risk is caused by the failed memory with high probability, the failed memory may be marked and separated, and other normal memory of the host machine is used continually, such that other services may work continually, thus improving efficiency and quality of service.

Based on the above, if the crash probability is greater than or equal to the second predetermined threshold, it is still possible that the host machine crashes. In order to further avoid the effect of the crash on the virtual machine service, the target virtual machines can be determined based on the number of all the virtual machines on the host machine and the crash probability, and the target virtual machines are transferred. The number of the target virtual machines is less than the number of all the virtual machines.

The virtual machines may be sorted based on service information (such as real-time service, service object or the like) of the virtual machines, and if it is determined that three to five virtual machines can be transferred based on the crash probability, then the last three virtual machines may be selected to be transferred. The target virtual machines and the number of the target virtual machines to be transferred may be select according to actual application, to further ensure the quality of service and the user experience.

In the embodiment, if the crash probability is less than the second threshold, only the failed memory is marked and other normal memory of the host machine is used continually.

With the method for handling a memory failure according to the embodiment of the present disclosure, the first control instruction sent by the kernel system is acquired, the information is written into the target position of the target memory page of the host machine based on the first control instruction, and the first code corresponding to the target position of the target memory page is generated based on the written information. The second control instruction sent by the kernel system is acquired, the information is read out from the target position of the target memory page of the host machine based on the second control instruction, and the second code corresponding to the target position of the target memory page is generated based on the read-out information. If the first code is different from the second code, it is determined that the failure occurs in the target memory page. The first code and the second code are parsed based on the predetermined algorithm, and difference codes between the parsed first code and the parsed second code are acquired. The incorrect bits corresponding to the target position of the target memory page are determined based on the difference codes. The number of the incorrect bits and the position features of the incorrect bits are obtained based on the incorrect bits. The pre-trained probability analysis model is acquired, and the failure parameter is inputted into the probability analysis model for process to obtain the crash probability of the host machine. If the crash probability is greater than or equal to the first predetermined threshold, all the virtual machines on the host machine are transferred to the target host machine. The crash probability of the target host machine is less than that of the second predetermined threshold which is less than the first predetermined threshold. If the crash probability is less than the first predetermined threshold but greater than or equal to the second predetermined threshold, the failed memory is marked. If the crash probability is less than the second predetermined threshold, the failed memory is marked and other normal memory of the host machine is used continually. In this way, an effect of a crash failure on the virtual machine can be avoided, thus improving user experience and quality of service.

In order to implement the above embodiments, the present disclosure proposes an apparatus for handing a memory failure.

Figure 4:
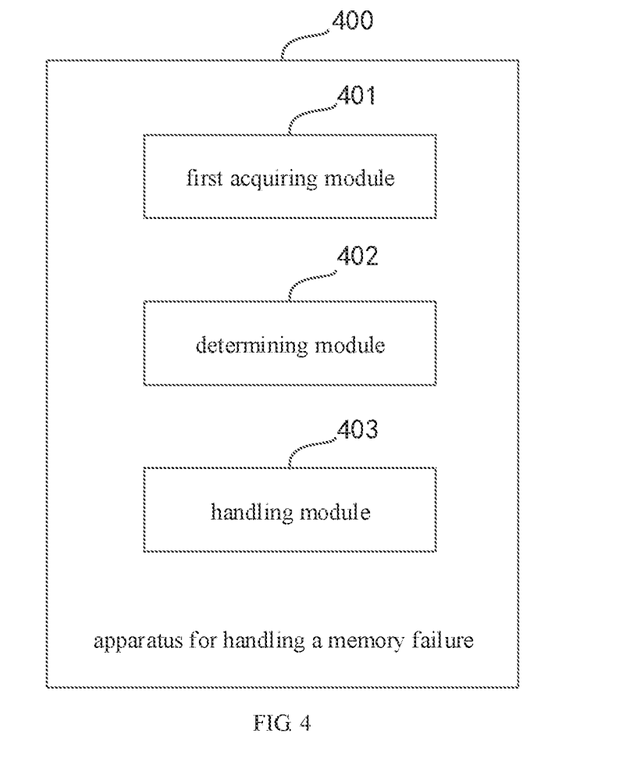
FIG. 4 is a block diagram showing an apparatus for handling a memory failure according to a fourth embodiment of the present disclosure.

FIG. 4 is a block diagram showing an apparatus for handling a memory failure according to a fourth embodiment of the present disclosure.

As illustrated in FIG. 4, the apparatus 400 may include a first acquiring module 401, a determining module 402 and a handling module 403.

The first acquiring module 401 is configured to acquire a failure parameter of memory of a host machine in response to detecting a failure occurring in the memory.

The determining module 402 is configured to determine a crash probability of the host machine based on the failure parameter.

The handling module 403 is configured to transfer all virtual machines on the host machine to a target host machine when the crash probability of the host machine is greater than or equal to a first predetermined threshold. A crash probability of the target host machine is less than a second predetermined threshold which is less than the first predetermined threshold.

Figure 5:
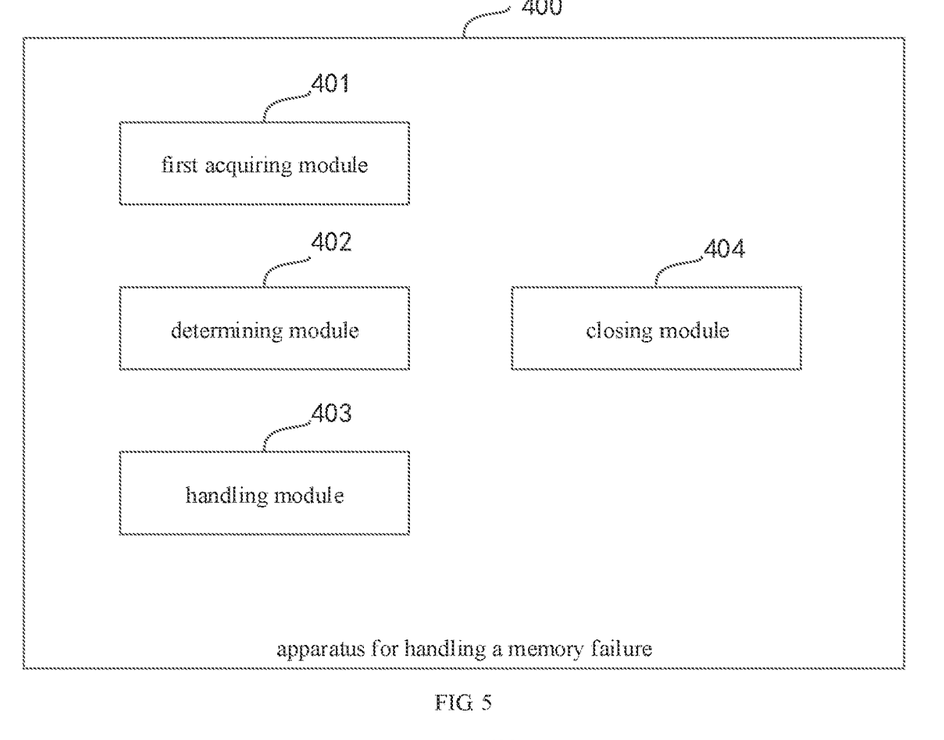
FIG. 5 is a block diagram showing an apparatus for handling a memory failure according to a fifth embodiment of the present disclosure.

FIG. 5 is a block diagram showing an apparatus for handling a memory failure according to a fifth embodiment of the present disclosure.

As illustrated in FIG. 5, based on FIG. 4, the apparatus 400 may further include a closing module 404.

The closing module 404 is configured to close a virtual machine process if the virtual machine process runs on the memory.

Thus, when the failure occurs in the memory of the host machine, the virtual machine process running on the failed memory is closed, such that an effect of a crash failure on the virtual machine can be avoided, thus improving user experience and quality of service.

Figure 6:
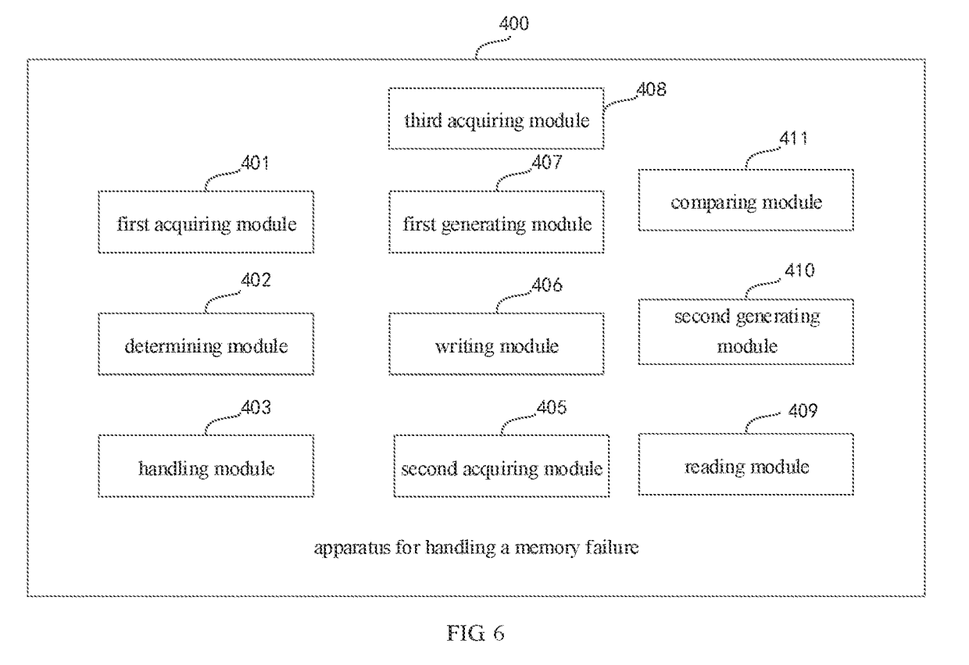
FIG. 6 is a block diagram showing an apparatus for handling a memory failure according to a sixth embodiment of the present disclosure.

As a possible implementation of the present disclosure, as illustrated in FIG. 6, based on FIG. 4, the apparatus may further include a second acquiring module 405, a writing module 406, a first generating module 407, a third acquiring module 408, a reading module 409, a second generating module 410 and a comparing module 411.

The second acquiring module 405 is configured to acquire a first control instruction sent by a kernel system.

The writing module 406 is configured to write information to a target position of a target memory page of the host machine based on the first control instruction.

The first generating module 407 is configured to generate a first code corresponding to the target position of the target memory page based on the written information.

The third acquiring module 408 is configured to acquire a second control instruction sent by a kernel system.

The reading module 409 is configured to read out information from the target position of the target memory page of the host machine based on the second control instruction.

The second generating module 410 is configured to generate a second code corresponding to the target position of the target memory page based on the read-out information.

The comparing module 411 is configured to compare the first code with the second code, and determine that the failure occurs in the target memory page if the first code and the second code are inconsistent.

In one possible implementation of the present disclosure, the first acquiring module 401 is configured to parse the first code and the second code based on a predetermined algorithm, acquire difference codes between the parsed first code and the parsed second code, determine one or more incorrect bits corresponding to the target position of the target memory page based on the difference codes, determine the number of the one or more incorrect bits and position features of the one or more incorrect bits based on the one or more incorrect bits.

In one possible implementation of the present disclosure, the determining module 402 is configured to acquire a pre-trained probability analysis model, input the failure parameter into the pre-trained probability analysis model for process to acquire the crash probability of the host machine.

Figure 7:
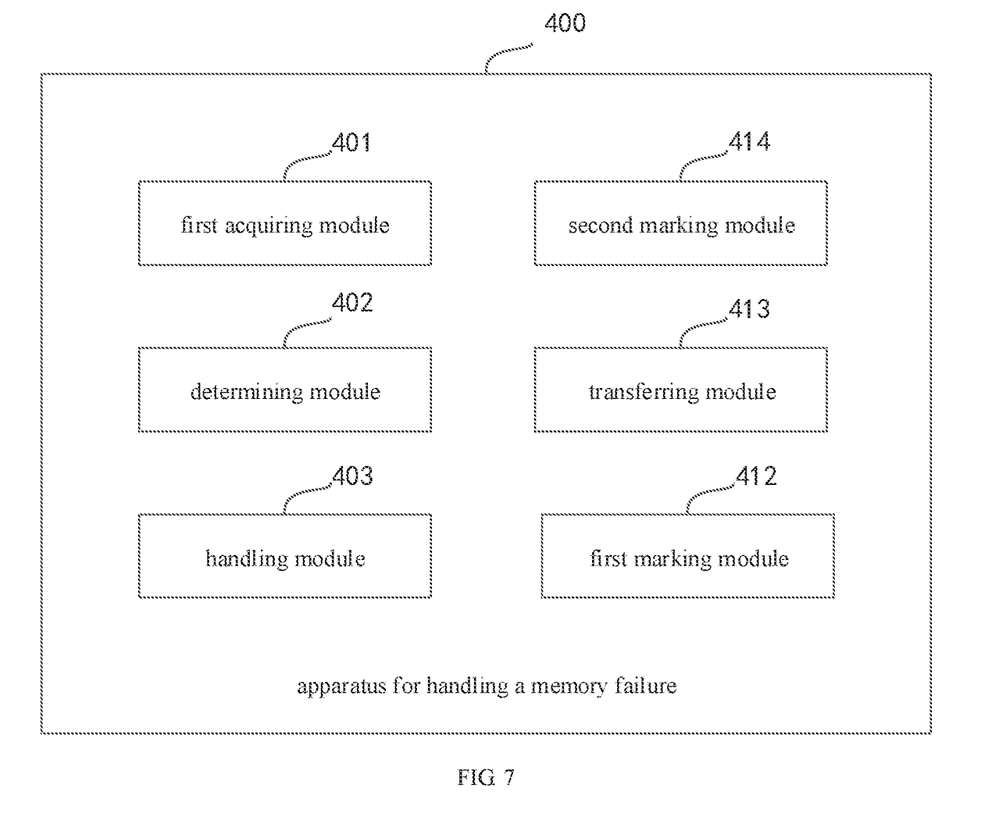
FIG. 7 is a block diagram showing an apparatus for handling a memory failure according to a seventh embodiment of the present disclosure.

In one possible implementation of the present disclosure, as illustrated in FIG. 7, based on FIG. 4, the apparatus may further include a first marking module 412, a transferring module 413 and a second marking module 414.

The first marking module 412 is configured to mark the failed memory and use other normal memory of the host machine continually if the crash probability is less than the first predetermined threshold and greater than or equal to the second predetermined threshold. The first predetermined threshold is greater than the second predetermined threshold.

The transferring module 413 is configured to determine target virtual machines based on the crash probability and the number of all the virtual machines on the host machine, and transfer the target virtual machines. The number of the target virtual machines is less than the number of all the virtual machines.

The second marking module 414 is configured to mark the failed memory and use other normal memory of the host machine continually if the crash probability is less than the second predetermined threshold. The first predetermined threshold is greater than the second predetermined threshold.

With the apparatus for handling a memory failure according to the embodiment of the present disclosure, when detecting the failure occurring in the memory of the host machine, the failure parameter of the failed memory is acquired, the crash probability of the host machine is determined based on the failure parameter and if the crash probability is greater than or equal to the first predetermined threshold, all the virtual machines on the host machine are transferred to the target host machine. The crash probability of the target host machine is less than the second predetermined threshold which is less than the first predetermined threshold. In this way, a problem that all the virtual machines on the host machine stop providing services when a failure occurs in the memory of the host machine can be avoided. The virtual machines on the host machine are transferred to the target host machine whose crash probability is less than that of the host machine when the crash probability of the host machine is greater than or equal to the predetermined threshold, such that an effect of a crash failure on the virtual machine can be avoided, thus improving user experience and quality of service.

According to the embodiments of the present disclosure, the disclosure also provides an electronic device and readable storage medium.

Figure 8:
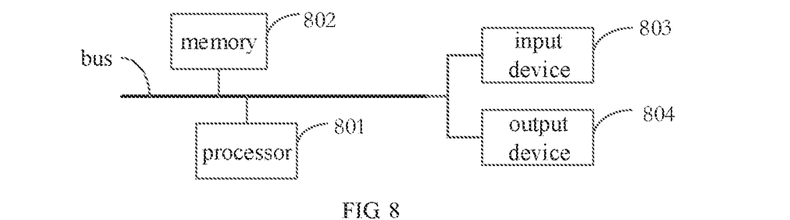
FIG. 8 is a block diagram showing an electronic device implementing the method for handling a memory failure according to an embodiment of the present disclosure.

FIG. 8 is a block diagram of an electronic device used to implement the method for handling a memory failure according to an embodiment of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 8, the electronic device includes: one or more processors 801, memory 802, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 801 is taken as an example in FIG. 8.

The memory 802 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 802 is configured to store non-transitory software programs, non-transitory computer executable programs and modules, such as program instructions/modules (for example, the first acquiring module 401, the determining module 402, and the handling module 403 shown in FIG. 4) corresponding to the method in the embodiment of the present disclosure. The processor 801 executes various functional applications and data processing of the server by running non-transitory software programs, instructions, and modules stored in the memory 802, that is, implementing the method in the foregoing method embodiments.

The memory 802 may include a storage program area and a storage data area, where the storage program area may store an operating system and application programs required for at least one function. The storage data area may store data created according to the use of the electronic device for implementing the method. In addition, the memory 802 may include a high-speed random access memory, and a non-transitory memory, such as at least one magnetic disk storage device, a flash memory device, or other non-transitory solid-state storage device. In some embodiments, the memory 802 may optionally include a memory remotely disposed with respect to the processor 801, and these remote memories may be connected to the electronic device for implementing the method through a network. Examples of the above network include, but are not limited to, the Internet, an intranet, a local area network, a mobile communication network, and combinations thereof.

The electronic device for implementing the method may further include: an input device 803 and an output device 804. The processor 801, the memory 802, the input device 803, and the output device 804 may be connected through a bus or in other manners. In FIG. 8, the connection through the bus is taken as an example.

The input device 803 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 804 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

In the technical solution of the present disclosure, when detecting the failure occurring in the memory of the host machine, the failure parameter of the failed memory is acquired, the crash probability of the host machine is determined based on the failure parameter and if the crash probability is greater than or equal to the first predetermined threshold, all the virtual machines on the host machine are transferred to the target host machine. The crash probability of the target host machine is less than the second predetermined threshold which is less than the first predetermined threshold. In this way, a problem that all the virtual machines on the host machine stop providing services when a failure occurs in the memory of the host machine can be avoided. The virtual machines on the host machine are transferred to the target host machine whose crash probability is less than that of the host machine when the crash probability of the host machine is greater than or equal to the predetermined threshold, such that an effect of a crash failure on the virtual machine can be avoided, thus improving user experience and quality of service.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the present disclosure. Those skilled in the art should understand that various modifications, combinations, sub-combinations and substitutions can be made according to design requirements and other factors.

What is claimed is:

1. A method for handling a memory failure, comprising:
in response to detecting a failure occurring in memory of a host machine, acquiring a failure parameter of the memory;
determining a crash probability of the host machine based on the failure parameter; and
transferring all virtual machines on the host machine to a target host machine when the crash probability is greater than or equal to a first predetermined threshold, wherein a crash probability of the target host machine is less than a second predetermined threshold, the second predetermined threshold is less than the first predetermined threshold;
wherein the method further comprises:
acquiring a first control instruction sent by a kernel system;
writing information into a target position of a target memory page of the host machine based on the first control instruction;
generating a first code corresponding to the target position of the target memory page based on the written information;
acquiring a second control instruction sent by a kernel system;
reading information out from the target position of the target memory page of the host machine based on the second control instruction;
generating a second code corresponding to the target position of the target memory page based on the read-out information; and
determining that the failure occurs in the target memory page when the first code is different from the second code;
wherein the acquiring the failure parameter of the memory comprises:
parsing the first code and the second code based on a predetermined algorithm;
acquiring difference codes between the first code and the second code after the parsing;
determining one or more incorrect bits corresponding to the target position of the target memory page based on the difference codes; and
determining a number of the one or more incorrect bits and position features of the one or more incorrect bits based on the one or more incorrect bits;
the method further comprising:
marking the memory when the crash probability of the host machine is less than the first predetermined threshold and greater than or equal to the second predetermined threshold; and
determining target virtual machines based on the crash probability of the host machine and a number of all the virtual machines on the host machine and transferring the target virtual machines, wherein a number of the target virtual machines is less than the number of all the virtual machines.

2. The method according to claim 1, further comprising:
closing a virtual machine process when the virtual machine process is running on the memory.

3. The method according to claim 1, wherein the determining the crash probability of the host machine based on the failure parameter comprises:
acquiring a pre-trained probability analysis model; and
inputting the failure parameter into the pre-trained probability analysis model for process to acquire the crash probability of the host machine.

4. The method according to claim 1, further comprising:
marking the memory when the crash probability of the host machine is less than the second predetermined threshold.

5. An electronic device, comprising:
at least one processor; and
memory communicatively coupled to the at least one processor;
the memory is configured to store instructions executable by the at least one processor;
wherein, when the instructions are executed by the at least one processor, the at least one processor is caused to implement the method for handling a memory failure, comprising:
in response to detecting a failure occurring in memory of a host machine, acquiring a failure parameter of the memory;
determining a crash probability of the host machine based on the failure parameter; and
transferring all virtual machines on the host machine to a target host machine when the crash probability is greater than or equal to a first predetermined threshold, wherein a crash probability of the target host machine is less than a second predetermined threshold, the second predetermined threshold is less than the first predetermined threshold;
wherein the at least one processor is caused to further implement operations of:
acquiring a first control instruction sent by a kernel system;
writing information into a target position of a target memory page of the host machine based on the first control instruction;
generating a first code corresponding to the target position of the target memory page based on the written information;
acquiring a second control instruction sent by a kernel system;
reading information out from the target position of the target memory page of the host machine based on the second control instruction;
generating a second code corresponding to the target position of the target memory page based on the read-out information; and
determining that the failure occurs in the target memory page when the first code is different from the second code;
wherein acquiring the failure parameter of the memory comprises:
parsing the first code and the second code based on a predetermined algorithm;
acquiring difference codes between the first code and the second code after the parsing;
determining one or more incorrect bits corresponding to the target position of the target memory page based on the difference codes; and
determining a number of the one or more incorrect bits and position features of the one or more incorrect bits based on the one or more incorrect bits;
wherein the at least one processor is caused to further implement operations of:
marking the memory when the crash probability of the host machine is less than the first predetermined threshold and greater than or equal to the second predetermined threshold; and
determining target virtual machines based on the crash probability of the host machine and a number of all the virtual machines on the host machine and transferring the target virtual machines, wherein a number of the target virtual machines is less than the number of all the virtual machines.

6. The electronic device according to claim 5, wherein the at least one processor is caused to further implement an operation of:
closing a virtual machine process when the virtual machine process is running on the memory.

7. The electronic device according to claim 5, wherein determining the crash probability of the host machine based on the failure parameter comprises:
acquiring a pre-trained probability analysis model; and
inputting the failure parameter into the pre-trained probability analysis model for process to acquire the crash probability of the host machine.

8. The electronic device according to claim 5, wherein the at least one processor is caused to further implement an operation of:
marking the memory when the crash probability of the host machine is less than the second predetermined threshold.

9. A non-transitory computer-readable storage medium having computer instructions stored thereon, wherein the computer instructions are configured to cause a computer to perform the method for handling a memory failure, comprising:
in response to detecting a failure occurring in memory of a host machine, acquiring a failure parameter of the memory;
determining a crash probability of the host machine based on the failure parameter; and
transferring all virtual machines on the host machine to a target host machine when the crash probability is greater than or equal to a first predetermined threshold, wherein a crash probability of the target host machine is less than a second predetermined threshold, the second predetermined threshold is less than the first predetermined threshold;
wherein the method further comprises:
acquiring a first control instruction sent by a kernel system;
writing information into a target position of a target memory page of the host machine based on the first control instruction;
generating a first code corresponding to the target position of the target memory page based on the written information;
acquiring a second control instruction sent by a kernel system;
reading information out from the target position of the target memory page of the host machine based on the second control instruction;
generating a second code corresponding to the target position of the target memory page based on the read-out information; and
determining that the failure occurs in the target memory page when the first code is different from the second code;
wherein acquiring the failure parameter of the memory comprises:
parsing the first code and the second code based on a predetermined algorithm;
acquiring difference codes between the first code and the second code after the parsing;
determining one or more incorrect bits corresponding to the target position of the target memory page based on the difference codes; and
determining a number of the one or more incorrect bits and position features of the one or more incorrect bits based on the one or more incorrect bits;
wherein the method further comprises:
marking the memory when the crash probability of the host machine is less than the first predetermined threshold and greater than or equal to the second predetermined threshold; and
determining target virtual machines based on the crash probability of the host machine and a number of all the virtual machines on the host machine and transferring the target virtual machines, wherein a number of the target virtual machines is less than the number of all the virtual machines.

10. The non-transitory computer-readable storage medium according to claim 9, wherein the method further comprises:
closing a virtual machine process when the virtual machine process is running on the memory.

11. The non-transitory computer-readable storage medium according to claim 9, wherein determining the crash probability of the host machine based on the failure parameter comprises:
    acquiring a pre-trained probability analysis model; and
    inputting the failure parameter into the pre-trained probability analysis model for process to acquire the crash probability of the host machine.

\* \* \* \* \*